US012160001B2

(12) United States Patent
Kim et al.

(10) Patent No.: US 12,160,001 B2
(45) Date of Patent: Dec. 3, 2024

(54) BINDER FOR ANODE FOR SECONDARY BATTERY, ANODE FOR SECONDARY BATTERY INCLUDING BINDER, AND LITHIUM SECONDARY BATTERY INCLUDING ANODE

(71) Applicant: SK On Co., Ltd., Seoul (KR)

(72) Inventors: Joon-Sup Kim, Daejeon (KR); Gwi Ok Park, Daejeon (KR); Ji Sang Jeong, Daejeon (KR); Min Kyung Seon, Daejeon (KR); Dong Gun Lee, Daejeon (KR); Sun Young Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 229 days.

(21) Appl. No.: 17/536,242

(22) Filed: Nov. 29, 2021

(65) Prior Publication Data

US 2022/0173400 A1  Jun. 2, 2022

(30) Foreign Application Priority Data

Nov. 30, 2020  (KR) .................. 10-2020-0164181

(51) Int. Cl.
*H01M 4/62* (2006.01)
*H01M 4/38* (2006.01)
*H01M 4/583* (2010.01)

(52) U.S. Cl.
CPC ........... *H01M 4/622* (2013.01); *H01M 4/386* (2013.01); *H01M 4/583* (2013.01)

(58) Field of Classification Search
None
See application file for complete search history.

(56) References Cited

U.S. PATENT DOCUMENTS

| 5,108,871 | A | * | 4/1992 | Yamano | ............. G03F 7/07 430/206 |
|---|---|---|---|---|---|
| 9,941,518 | B2 | | 4/2018 | Sakurai et al. | |
| 2012/0237826 | A1 | | 9/2012 | Kim et al. | |
| 2016/0156024 | A1 | * | 6/2016 | Kinpara | ............. H01M 4/386 252/511 |
| 2019/0027756 | A1 | | 1/2019 | Narutomi et al. | |
| 2020/0075941 | A1 | | 3/2020 | Kim et al. | |
| 2020/0152986 | A1 | | 5/2020 | Lee et al. | |

FOREIGN PATENT DOCUMENTS

| KR | 1020120106041 A | 9/2012 |
|---|---|---|
| KR | 1020180120741 A | 11/2018 |
| KR | 1020200027786 A | 3/2020 |
| KR | 1020200056136 A | 5/2020 |

* cited by examiner

*Primary Examiner* — Matthew T Martin
*Assistant Examiner* — Ankith R Sripathi
(74) *Attorney, Agent, or Firm* — The Webb Law Firm

(57) ABSTRACT

The present invention relates to a binder for an anode for a secondary battery, an anode including the binder, and a secondary battery including the anode. More particularly, the present invention relates to a binder for an anode for a secondary battery that has excellent heat resistance and mechanical properties and an improved binding force because a copolymer is used for the binder, and an anode for a secondary battery. In addition, expansion and shrinkage of the anode may be efficiently suppressed, such that charge and discharge life characteristics and performance of the secondary battery may be improved.

13 Claims, No Drawings

BINDER FOR ANODE FOR SECONDARY BATTERY, ANODE FOR SECONDARY BATTERY INCLUDING BINDER, AND LITHIUM SECONDARY BATTERY INCLUDING ANODE

CROSS-REFERENCE TO RELATED APPLICATION

This application claims priority to Korean Patent Application No. 10-2020-0164181 filed Nov. 30, 2020, the disclosure of which is hereby incorporated by reference in its entirety.

BACKGROUND OF THE INVENTION

Field of the Invention

The following disclosure relates to a binder for an anode for a secondary battery, an anode including the binder, and a secondary battery including the anode.

Description of Related Art

More particularly, the following disclosure relates to a binder for an anode for a secondary battery that has excellent heat resistance and mechanical properties and an improved binding force because a copolymer according to the present invention is used for the binder, and an anode for a secondary battery.

In addition, expansion and shrinkage of an anode may be suppressed using the anode according to the present invention, such that charge and discharge life characteristics and performance of a secondary battery may be improved.

In accordance with an extension of an application range of the secondary battery from small electronic devices to electric vehicles and power storage, a demand for an electrode material for a secondary battery having high safety, long lifespan, high energy density, and high output properties has increased.

A lithium secondary battery refers to a battery including a cathode including a cathode active material capable of intercalating/deintercalating lithium ions, an anode including an anode active material capable of intercalating/deintercalating lithium ions, and a non-aqueous electrolyte containing lithium ions in an electrode assembly in which a microporous separator is interposed between the cathode and the anode.

In the anode for a lithium secondary battery, properties exhibited after charging and discharging may be adversely affected in many cases. In particular, in a case of an active material expanded to about 300% of its own size due to properties of a metal during charging and discharging, such as a silicon-based active material, there is a limitation in using the existing system, and in a case of using a binder according to the related art, charge and discharge characteristics are significantly deteriorated.

Meanwhile, a binder such as carboxymethyl cellulose (CMC) or styrene butadiene rubber (SBR) as a binder for an anode active material may partially solve volume expansion due to the use of the silicon-based active material, but battery characteristics are deteriorated during charging and discharging due to a low adhesive force of the binder.

Accordingly, there is a need for a novel binder for an anode for a secondary battery that may prevent deterioration due to peeling and deintercalation of an active material even though a volume of an electrode is changed during charging and discharging, may improve structural stability of the electrode, may suppress an increase in resistance due to volume expansion, and thus may improve a lifespan and performance of the battery because the binder has a strong adhesive force.

RELATED ART DOCUMENT

Patent Document (Patent Document 1) Korean Patent Laid-Open Publication No. 10-2012-0106041 (Sep. 26, 2012)

SUMMARY OF THE INVENTION

An embodiment of the present invention is directed to providing a binder for an anode for a secondary battery that may improve mechanical properties and adhesion properties of a binder for an anode active material of a secondary battery that contains a silicon-based anode active material and may suppress expansion of the anode, an anode including the binder, and a secondary battery including the anode.

Another embodiment of the present invention is directed to providing a binder for an anode for a secondary battery that may improve charge and discharge life characteristics and performance of the secondary battery by suppressing expansion and shrinkage of the anode, an anode including the binder, and a secondary battery including the anode.

Still another embodiment of the present invention is directed to providing a binder for an anode for a secondary battery that has excellent heat resistance and mechanical properties and an improved binding force, an anode including the binder, and a secondary battery including the anode.

Further still another embodiment of the present invention is directed to providing a composition for an anode for a secondary battery that may implement an improvement of a battery performance by suppressing peeling and deintercalation of an anode active material by improving coatability and adhesion properties of a binder for an anode.

In one general aspect, a binder for an anode for a secondary battery contains a copolymer having a main chain composed of a repeating unit (A) of the following Formula 1, a repeating unit (B) of the following Formula 2, a repeating unit (C) of the following Formula 3, and a repeating unit (D) of the following Formula 4,

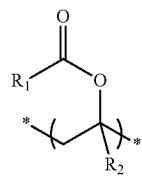

[Formula 1]

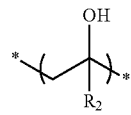

[Formula 2]

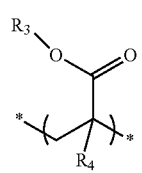

[Formula 3]

-continued

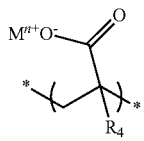

[Formula 4]

wherein $R_1$ and $R_3$ are each independently substituted or unsubstituted (C1-C10)hydrocarbyl, $R_2$ and $R_4$ are each independently hydrogen or substituted or unsubstituted (C1-C10)hydrocarbyl, $M^{n+}$ is a cation with an oxidation number of n excluding hydrogen ions, and n is an integer of 1 to 3.

The copolymer may be a random copolymer.

(a+b):(c+d) in the copolymer may be 5:95 to 95:5, in which a is the number of moles of the repeating unit (A), b is the number of moles of the repeating unit (B), c is the number of moles of the repeating unit (C), and d is the number of moles of the repeating unit (D).

a:b in the copolymer may be 5:95 to 60:40, in which a is the number of moles of the repeating unit (A) and b is the number of moles of the repeating unit (B).

c:d in the copolymer may be 5:95 to 50:50, in which c is the number of moles of the repeating unit (C) and d is the number of moles of the repeating unit (D).

A saponification ratio of the copolymer may satisfy Expression 1, 0.45<saponification ratio=(b+d)/(a+b+c+d)<1.00    (Expression 1)

wherein a is the number of moles of the repeating unit (A), b is the number of moles of the repeating unit (B), c is the number of moles of the repeating unit (C), and d is the number of moles of the repeating unit (D).

A weight average molecular weight of the copolymer may be 100,000 to 2,000,000 g/mol.

In another general aspect, a composition for an anode for a secondary battery contains an anode active material and the binder for an anode for a secondary battery.

The anode active material may include a silicon-based active material.

The anode active material may further include a graphite-based active material.

A mass ratio of the silicon-based active material to the graphite-based active material may be 97:3 to 3:97.

A solid content of the composition may be 45 wt % or more.

In still another general aspect, an anode for a secondary battery includes a current collector and an anode active material layer disposed on the current collector, wherein the anode active material layer is formed of the composition for an anode for a secondary battery.

A content of the binder in the anode active material layer may be 0.5 to 30 wt %.

A thickness of the anode active material layer may be 10 to 120 μm.

In further still another general aspect, a secondary battery includes the anode, a cathode, a separator interposed between the anode and the cathode, and an electrolyte.

An expansion rate of the secondary battery may be 65% or less.

A capacity retention rate of the secondary battery after 50 cycles of charging and discharging may be 80% or more.

Other features and aspects will be apparent from the following detailed description, the drawings, and the claims.

DESCRIPTION OF THE INVENTION

Hereinafter, the present invention will be described in more detail. However, each of the following specific exemplary embodiments or exemplary embodiments is merely one reference example for describing the present invention in detail, and the present invention is not limited thereto and may be implemented in various forms.

In addition, unless otherwise defined, all the technical terms and scientific terms used herein have the same meanings as commonly understood by those skilled in the art to which the present invention pertains.

The terms used in the description of the present invention are merely used to effectively describe a specific exemplary embodiment, but are not intended to limit the present invention.

In addition, unless the context clearly indicates otherwise, the singular forms used in the specification and appended claims are intended to include the plural forms.

In addition, unless explicitly described to the contrary, "comprising" any components will be understood to imply further inclusion of other components rather than the exclusion of any other components.

The present invention relates to a novel binder for an anode for a secondary battery that has excellent heat resistance and mechanical properties and an improved binding force and suppresses expansion of the anode even when a silicon-based anode active material is used because a copolymer according to an exemplary embodiment of the present invention is used for the binder, an anode for a secondary battery including the binder, and a secondary battery including the anode.

The binder for an anode for a secondary battery has improved mechanical properties and binding force, such that peeling and deintercalation of an anode active material may be suppressed, thereby providing a composition for an anode for a secondary battery that may implement an improvement of a battery performance.

In addition, the present inventors found that it is possible to provide a binder for an anode for a secondary battery that suppresses expansion and shrinkage of an anode including the binder for an anode according to an exemplary embodiment of the present invention and improves charge and discharge life characteristics and performance of the secondary battery, an anode including the binder, and a secondary battery including the anode, thereby completing the present invention.

A binder for an anode for a secondary battery according to an exemplary embodiment of the present invention contains a copolymer having a main chain composed of a repeating unit (A) of Formula 1, a repeating unit (B) of Formula 2, a repeating unit (C) of Formula 3, and a repeating unit (D) of Formula 4,

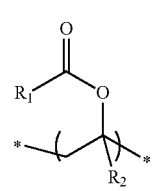

[Formula 1]

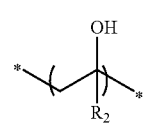

[Formula 2]

-continued

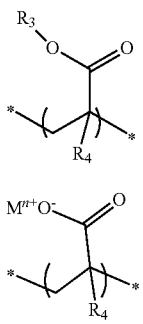

[Formula 3]

[Formula 4]

wherein $R_1$ and $R_3$ are each independently substituted or unsubstituted (C1-C10)hydrocarbyl, $R_2$ and $R_4$ are each independently hydrogen or substituted or unsubstituted (C1-C10)hydrocarbyl, $M^{n+}$ is a cation with an oxidation number of n excluding hydrogen ions, and n is an integer of 1 to 3.

The hydrocarbyl includes (C1-C10)alkyl, (C6-C10)aryl, (C6)ar(C1-C4)alkyl, (C2-C10)alkenyl, (C2-C10)alkynyl, (C3-C7)cycloalkyl, hetero(C5-C10)aryl, hetero(C3-C7)cycloalkyl, and the like.

More specifically, $R_1$ and $R_3$ may be each independently (C1-C5)alkyl, and more preferably, may be selected from methyl, ethyl, and propyl.

More specifically, $R_2$ and $R_4$ may be each independently hydrogen or (C1-C5)alkyl, and more preferably, may be selected from hydrogen, methyl, ethyl, and propyl.

PUMA specific example of Formula 1 may include a unit derived from vinyl acetate, a specific example of Formula 2 may include a unit derived from vinyl alcohol, a specific example of Formula 3 may include a unit derived from (meth)acrylate, and a specific example of Formula 4 may include a unit derived from (meth)acrylic acid salts.

When n is 1, a cation of the (meth)acrylic acid salts may be an alkali metal ion, and preferably, may be at least one selected from a sodium ion, a potassium ion, and a lithium ion, or may be an ammonium ion ($NH_4^+$). In addition, when n is 2, the cation may be an alkaline earth metal ion, and preferably may be Ca or Mg. When n is 3, the cation may be a metal ion of Al or Ga. The cation is not limited as long as it is a metal ion known by those skilled in the art.

In a case where a binder for an anode for a secondary battery contains a copolymer having a main chain composed of the units of Formulas 1 to 4, a binding force between an anode current collector and an anode active material layer or a binding force of an anode active material layer is improved, such that peeling and deintercalation of an anode active material may be suppressed and strength and flexibility of the anode active material layer may be improved.

In addition, even in a case of using a silicon-based anode active material, an effect of suppressing expansion of the anode and thus stabilizing the performance of the battery may be obtained.

In the binder for an anode for a secondary battery according to an exemplary embodiment of the present invention, the copolymer may be a random copolymer. In addition, the copolymer may be a block copolymer in which repeating unit blocks are linearly linked, and may be a random copolymer or a block copolymer as long as the four units described above form a backbone, but a random copolymer is more preferred in order to achieve the object of the present invention.

Since the random copolymer satisfying the units of Formulas 1 to 4 has high solubility in water, when a composition for an anode for a secondary battery is prepared, processability may be improved. In addition, since the polymer main chain has a sufficient tensile strength and flexibility, strength and flexibility of the anode active material layer may be improved.

In the binder for an anode for a secondary battery according to an exemplary embodiment of the present invention, (a+b):(c+d) in the copolymer may be 5:95 to 95:5, specifically, 10:90 to 90:10, and more specifically, 20:80 to 80:20. a is the number of moles of the repeating unit (A), b is the number of moles of the repeating unit (B), c is the number of moles of the repeating unit (C), and d is the number of moles of the repeating unit (D).

a:b in the copolymer may be 5:95 to 60:40, specifically, 10:90 to 50:50, and more specifically, 15:85 to 45:55.

c:d in the copolymer may be 5:95 to 50:50, specifically, 10:90 to 45:55, and more specifically, 15:85 to 40:60.

In the binder for an anode for a secondary battery according to an exemplary embodiment of the present invention, it is more preferable that a saponification ratio of the copolymer satisfies Expression 1 in terms of achieving the object of the present invention.

$$0.45 < \text{saponification ratio} = (b+d)/(a+b+c+d) < 1.00 \quad \text{[Expression 1]}$$

More specifically, the saponification ratio may satisfy a range of 0.5 to 0.95, and more preferably, may satisfy a range of 0.6 to 0.85.

When the saponification ratio satisfies the above range, the binder for an anode has a more excellent tensile strength and adhesive force, and when a composition for an anode for a secondary battery that contains the binder for an anode is prepared, there is no aggregation and coatability is excellent, which is more preferable.

In addition, adhesion properties of the binder for an anode are improved, such that peeling and deintercalation of the anode active material from the current collector may be suppressed.

In addition, when the saponification ratio satisfies the above range, the binder for an anode has excellent coatability and adhesion properties, such that the binding force between the anode active material and the current collect may be improved and expansion and shrinkage of the anode may be prevented, thereby improving charge and discharge characteristics and performance of the secondary battery.

In the binder for an anode for a secondary battery according to an exemplary embodiment of the present invention, a weight average molecular weight of the copolymer may be 100,000 to 2,000,000 g/mol. For example, the weight average molecular weight of the copolymer may be 200,000 to 1,800,000 g/mol. Specifically, the weight average molecular weight of the copolymer may be 400,000 to 1,600,000 g/mol. More specifically, the weight average molecular weight of the copolymer may be 500,000 to 1,500,000 g/mol. However, the present invention is not limited thereto. When the weight average molecular weight satisfies the above range, the adhesive force may be further improved.

The binder may be prepared by various known methods such as emulsion polymerization, suspension polymerization, solution polymerization, and bulk polymerization.

An exemplary embodiment of the present invention provides a composition for an anode for a secondary battery that contains the binder for an anode for a secondary battery and an anode active material.

The anode active material may be one or two or more selected from a graphite-based active material, platinum, palladium, a silicon-based active material, silver, aluminum, bismuth, tin, zinc, a silicon-carbon composite active material, and a combination thereof. A silicon-based active material or an anode active material including a silicon-based active material is preferred in terms of an effect of sufficiently suppressing expansion of the anode, but the present invention is not limited thereto in terms of an excellent binding force and excellent electrical properties. As a preferred exemplary embodiment of the present invention, the anode active material may include a silicon-based active material and a graphite-based active material, and a mass ratio of the silicon-based active material to the graphite-based active material may be 97:3 to 3:97.

The silicon-based active material may include a silicon-based material, for example, Si, $SiO_x$ (0<x<2), a Si-Q alloy (Q is an element selected from the group consisting of an alkali metal, an alkaline earth metal, Group 13 element, Group 14 element, Group 15 element, Group 16 element, a transition metal, a rare earth element, and a combination thereof, but is not Si or C), and a silicon-carbon composite. The silicon-carbon composite may include, for example, silicon carbide (SiC) or silicon-carbon particles having a core-shell structure. The silicon-carbon particles may be formed, for example, by depositing a silicon layer on a surface of a graphite core. In an exemplary embodiment, the silicon-carbon particles may be formed by coating a silicon layer on graphite particles through a chemical vapor deposition (CVD) process using a silicon precursor compound such as a silane-based compound. In some exemplary embodiments, the particle may further include, for example, an amorphous carbon coating.

The graphite-based active material may be artificial graphite or a mixture of artificial graphite and natural graphite. The graphite-based active material may have a particle size of 8 to 20 μm, and may be an amorphous, plate-like, flake-like, spherical, or fibrous, but the present invention is not limited thereto. Meanwhile, the graphite-based active material is a mixture of artificial graphite and natural graphite, a content of the artificial graphite may be preferably the same as or higher than a content of the natural graphite, and a weight ratio of the artificial graphite to the natural graphite may be preferably 95:5 to 50:50, more preferably 90:10 to 50:50, and still more preferably 90:10 to 60:40. Therefore, the adhesive force between the current collector and the active material layer is improved, such that a high-rate charge capacity retention rate and general lifespan characteristics may be improved, which is preferable.

The composition for an anode for a secondary battery may further contain a conductive material and a solvent.

The conductive material may be used for imparting conductivity to the electrode. Any electronic conductive material may be used as long as it does not cause chemical changes in a battery to be produced. At least one selected from the group consisting of a graphite-based conductive material, a carbon black-based conductive material, graphene, carbon nanotube, a metal, and a metal compound-based conductive material may be used. Examples of the graphite-based conductive material include artificial graphite and natural graphite. Examples of the carbon black-based conductive material include acetylene black, Ketjenblack, thermal black, and channel black. Examples of the metal-based or metal compound-based conductive material include tin, tin oxide, tin phosphate ($SnPO_4$), titanium oxide, potassium titanate, and a perovskite material such as $LaSrCoO_3$ or $LaSrMnO_3$. However, the present invention is not limited to the conductive materials described above.

The conductive material is not particularly limited, and a content of the conductive material may be appropriately adjusted according to the purpose of use. The content of the conductive material may be 1 to 30 wt % with respect to the anode active material.

The solvent is a solvent for forming a composition for an anode for a secondary battery, and a water-soluble solvent such as water may be used. The solvent is preferably used in an amount at which the composition has an appropriate viscosity in consideration of applicability and coatability of the composition for an anode for a secondary battery.

A solid content of the composition for an anode for a secondary battery according to an exemplary embodiment of the present invention may be 45 wt % or more. An upper limit thereof is not limited, and may be 99.9 wt %, but the present invention is not limited thereto.

An exemplary embodiment of the present invention may provide an anode for a secondary battery including a current collector and an anode active material layer disposed on the current collector, wherein the anode active material layer is formed of the composition for an anode for a secondary battery described in the present invention.

One selected from the group consisting of a copper foil, a nickel foil, a stainless steel foil, a titanium foil, a nickel foam, a copper foam, a polymer substrate coated with a conductive metal, and a combination thereof may be used as the current collector, but the present invention is not limited thereto. Any material known in the art may be used.

A content of the binder in the anode active material layer may be 0.5 to 30 wt %. The content of the binder in the anode active material layer may be, specifically, 1 to 20 wt %, and more specifically, 1 to 10 wt %. However, the content of the binder is not particularly limited in a range in which the performance of the secondary battery is not deteriorated. When the content is within the above range, the expansion of the anode occurring during charging and discharging may be suppressed, deintercalation of the anode active material may be suppressed, and improvements of the capacity and energy density of the secondary battery may be implemented, which is preferable.

A thickness of the anode active material layer may be 10 to 130 μm, and specifically, 10 to 120 μm, and more preferably, may be 10 to 90 μm, but is not limited thereto.

An exemplary embodiment of the present invention provides a secondary battery including the anode described in the present invention, a cathode, a separator interposed between the anode and the cathode, and an electrolyte. The anode is the same as described above.

The cathode includes a current collector, and a cathode active material layer formed by applying a composition for a cathode containing a cathode active material on the current collector.

The anode current collector may be used as the current collector, and any material known in the art may be used. However, the present invention is not limited thereto.

The cathode active material layer may include a cathode active material, and may optionally further include a binder for a cathode and a conductive material. A cathode active material known in the art may be used as the cathode active material. It is preferable that a composite oxide of lithium and a metal selected from cobalt, manganese, nickel, and a combination thereof is used as the cathode active material. However, the present invention is not limited thereto.

The anode binder and the anode conductive material described above may be used as the binder for a cathode and the conductive material, respectively, and any material known in the art may be used. However, the present invention is not limited thereto.

The separator may be selected from a glass fiber, polyester, polyethylene, polypropylene, polytetrafluoroethylene, and a combination thereof, and may be in a form of a nonwoven fabric or a woven fabric. In a lithium secondary battery, for example, a polyolefin-based polymer separator such as polyethylene or polypropylene may be mainly used, a separator coated with a composition containing a ceramic component or a polymer material may be used to secure heat resistance and mechanical strength, a separator having a single layer or multilayer structure may be selectively used, or a separator known in the art may be used. However, the present invention is not limited thereto.

The electrolyte is an electrolytic solution and includes an organic solvent and a lithium salt.

The organic solvent functions as a medium through which ions involved in an electrochemical reaction of the battery may move. For example, a carbonate-based solvent, an ester-based solvent, an ether-based solvent, a ketone-based solvent, an alcohol-based solvent, or an aprotic solvent may be used. The organic solvents may be used alone or a mixture of two or more thereof. When a mixture of two or more organic solvents is used, a mixing ratio may be appropriately adjusted according to a desired battery performance. Meanwhile, an organic solvent known in the art may be used, but the present invention is not limited thereto.

The lithium salt is a material that is dissolved in the organic solvent to act as a supply source of the lithium ions in the battery, enables a basic operation of the lithium secondary battery, and serves to promote movement of the lithium ions between the cathode and the anode. Examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, and a combination thereof. However, the present invention is not limited thereto.

A concentration of the lithium salt may be within a range of 0.1 M to 2.0 M. When the concentration of the lithium salt is within the above range, the electrolytic solution has appropriate conductivity and viscosity, and thus, an excellent performance of the electrolytic solution may be exhibited and the lithium ions may effectively move.

In addition, in order to improve charge and discharge characteristics, flame retardancy properties, and the like, the electrolytic solution may further include pyridine, triethyl phosphate, triethanolamine, cyclic ether, ethylene diamine, n-glyme, hexaphosphoric acid triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, and the like, if necessary. In some cases, in order to impart noninflammability, the electrolytic solution may further include a halogen-containing solvent such as carbon tetrachloride or trifluoroethylene, and in order to improve high-temperature storage characteristics, the electrolytic solution may further include fluoro-ethylene carbonate (FEC), propene sultone (PRS), fluoro-propylene carbonate (FPC), and the like.

An expansion rate of the secondary battery according to an exemplary embodiment of the present invention ay be 65% or less. More specifically, the expansion rate of the secondary battery may be 60% or less, and more preferably, may be 58% or less. When the expansion rate of the secondary battery according to the present invention satisfies the above value, the adhesive force is strong, such that deterioration due to separation of the active material may be prevented even when the volume of the electrode is changed during charging and discharging and the structural stability of the electrode may be improved, thereby suppressing an increase in resistance due to the volume expansion. As a result, the lifespan and performance of the battery may be improved.

A capacity retention rate of the secondary battery according to an exemplary embodiment of the present invention after 50 cycles of charging and discharging may be 80% or more, preferably 82% or more, and more preferably 85% or more. In the secondary battery according to an exemplary embodiment of the present invention, a high capacity retention rate after charging and discharging may be maintained, and expansion and shrinkage of the anode may be suppressed. Therefore, the charge and discharge life characteristics and performance of the secondary battery may be improved.

Hereinafter, the present invention will be described in more detail with reference to Examples and Comparative Examples. However, the following Examples and Comparative Examples are only examples for describing the present invention in more detail, and the present invention is not limited by the following Examples and Comparative Examples.

Physical properties in Examples and Comparative Examples of the present invention were measured by the following methods.

[Weight Average Molecular Weight]

In the measurement, GPC (Agilent Technologies) was used, Mixed C (×2 ea) (Agilent Technologies) was used as a GPC column, tetrahydrofuran was used as a solvent, polystyrene was used as a standard material, and analysis was performed at room temperature and a flow rate of 1 mL/min.

[Adhesive Force]

An adhesive force of each anode was measured using a universal testing machine (UTM). Specifically, the adhesive force was evaluated by attaching a tape to a surface of the rolled anode and measuring a force when tearing off the tape at an angle of 180° and a speed of 30 mm/min.

[Tensile Strength Evaluation]

A tensile strength was measured according to the method described in ASTM D638. The prepared aqueous binder solution was applied and dried onto a substrate to form a film having a thickness of 50 μm, and the film was cut into a type IV, thereby preparing a sample. The sample was pulled out at a speed of 3 mm/min using a universal testing machine (UTM) to measure a tensile strength when the sample was deformed or fractured. The measurement values are shown in Table 1.

[Coatability of Composition for Anode for Secondary Battery]

A composition for an anode for a secondary battery was prepared and coated on a copper foil, and the coatability of the composition for an anode for a secondary battery was evaluated based on the following criteria.

◎: The composition was entirely uniformly coated and no aggregate was observed.

○: The composition was entirely uniformly coated (fewer than five aggregates were observed per unit area (100×100 mm)).

Δ: A small amount of aggregates was observed (five to fewer than twenty aggregates were observed per unit area (100×100 mm)).

x: A large number of aggregates were observed (twenty or more aggregates were observed per unit area (100×100 mm)).

[Battery Lifespan Characteristics]

A CR2016 coin-type half cell was produced and electrochemical properties thereof were evaluated.

1) Initial Charge and Discharge Capacity and Initial Charge and Discharge Efficiency The lithium secondary battery produced in each of Examples was charged and discharged once at 0.1 C between 0.01 to 1.5 V to measure the charge capacity, discharge capacity, and initial efficiency. The results are shown in Table 2.

2) Lifespan Characteristics

The lithium secondary battery produced in each of Examples was charged and discharged once at 0.5 C between 0.01 to 1.5 V to measure lifespan characteristics of the battery. The lifespan characteristics were evaluated from a discharge capacity retention rate, and the discharge capacity retention rate was expressed as a ratio (%) of the capacity after repeating 50 cycles of charging and discharging to the initial capacity. The results thereof are shown in Table 1.

[Evaluation of Expansion Rate of Battery]

A thickness (t1) of the anode of the produced secondary battery was measured, the coin-type half cell was charged to 0.01 V at a rate of 0.1 C, the half cell was disassembled and charged, and then a thickness (t2) of the anode was measured to measure an expansion rate of the anode. The expansion rate may be represented by the following Expression 2.

Expansion rate: $(t2-t1)/t1\times100$ [Expression 2]

t1 was a thickness of each produced anode before the test.

t2 was a thickness of the anode obtained by charging the coin-type half cell to 0.01 V at a rate of 0.1 C and disassembling and charging the half cell. The expansion rate according to Expression 2 was calculated. The results thereof are shown in Table 2.

Example 1

[Synthesis of Copolymer]

90 g of water, 0.91 g of sodium dodecylbenzene sulfonate (SDBS), and 0.13 g of sodium hydrogen carbonate were added to a round-bottom flask, and the inside atmosphere of the flask was replaced with a nitrogen atmosphere. Next, the temperature was increased to 65° C., 30.0 g of vinyl acetate monomers and 13.6 g of methyl acrylate monomers were added dropwise for 3 hours immediately after adding an aqueous solution obtained by dissolving 0.05 g of potassium persulfate in 2 g of water, and the mixture was further stirred at 65° C. for 2 hours to complete the reaction. Thereafter, a polymerization solution was added to 450 g of a saturated aqueous sodium chloride solution to agglomerate a copolymer, and the solid content was filtered and dried, thereby obtaining 39 g of a vinyl acetate/methyl acrylate copolymer. The obtained polymer was dissolved in THF, filtering was performed with a filter, and a weight average molecular weight of the obtained polymer was measured by a molecular weight measuring apparatus (GPC, RI detector). The weight average molecular weight of the obtained polymer was 770 kDa.

[Saponification Reaction of Copolymer]

150 ml of water, 150 ml of methanol, 12.5 g of sodium hydroxide, and 30 g of the copolymer produced in the above reaction were added to a round-bottom flask. Next, the temperature was increased to 60° C., and the mixture was stirred overnight to complete a saponification reaction.

Thereafter, a saponified copolymer solution was added to 1 L of ethanol to precipitate the saponified copolymer, and the solid content was filtered and dried, thereby obtaining 18 g of a vinyl acetate/vinyl alcohol/methyl acrylate/sodium acrylate copolymer. A composition ratio of the obtained copolymer was confirmed by $^{13}$C-NMR, and a molar ratio of vinyl acetate/vinyl alcohol/methyl acrylate/sodium acrylate in the copolymer was 4/64/2/30.

[Preparation of Aqueous Copolymer Binder Solution]

10 g of the copolymer subjected to the saponification reaction and 90 g of water were added to a round-bottom flask. Next, the temperature was increased to 60° C., and the mixture was stirred for 6 hours, thereby preparing an aqueous copolymer binder solution. The physical properties such as the tensile strength and adhesive force measured using the prepared aqueous binder solution are shown in Table 1.

[Production of Anode for Secondary Battery]

The prepared aqueous binder solution was mixed with a homomixer at 70° C. and 1,500 rpm for 180 minutes to prepare 10.0 wt % of a dispersion in which the binder was dispersed. 25 g of a CNT-based conductive material solution (1 wt %) and 30 g of water were added to 30 g of the binder dispersion, and dispersion was performed by a homomixer. 95.75 g of a mixed active material (anode active material) composed of $SiO_x$ ($0<x<2$) having a size of 6 μm (22%) and graphite (78%) was added to the dispersion, and mixing was performed at 45 rpm using a planetary mixer for 40 minutes, thereby preparing a composition for an anode for a secondary battery. 10 g of the remaining binder solution and 10 g of water were added to the composition for an anode for a secondary battery, and mixing was performed at 45 rpm using the planetary mixer again for 40 minutes. The composition for an anode for a secondary battery prepared as described above was a mixed solution (solid content: 49.8 wt %) in which the anode active material, the conductive material, and the binder were mixed in a weight ratio of 95.75:0.25:4.0. The prepared composition for an anode for a secondary battery was applied to an anode current collector having a thickness of 10 μm so that an electrode loading (mg/cm$^2$) was 5.6 mg per unit area, the anode current collector was dried in a vacuum oven at 70° C. for 10 hours, and the anode current collector was rolled between rolls heated to 50° C. at a pressure of 15 MPa, thereby producing an anode having a final thickness of 50 μm (current collector+active material layer). The physical properties are shown in Table 1.

[Production of Lithium Secondary Battery]

Nickel-based composite oxide (nickel-manganese-cobalt (NMC(LiNiMnCoO$_2$))) as a cathode active material, a carbon black-based conductive material, and a PDVF powder as a binder for a cathode were mixed in an N-methyl-2-pyrrolidone solvent in a weight ratio of 92:2:6 to prepare a composition for a cathode. The prepared composition for a cathode was applied to a cathode current collector having a thickness of 15 μm so that an electrode loading (mg/cm$^2$) was 23.4 mg per unit area, the cathode current collector was dried in a vacuum oven at 120° C. for 10 hours, and the cathode current collector was rolled between rolls heated to 80° C. at a pressure of 15 MPa, thereby producing a cathode having a final thickness of 74.0 μm (current collector+active material layer). The produced anode and cathode and a porous polyethylene separator were assembled by using a stacking method, and an electrolytic solution (ethylene carbonate (EC)/ethylmethyl carbonate (EMC)=½ (volume ratio) and lithium hexafluorophosphate (LiPF$_6$: 1 mole)) was injected into the assembled battery to produce a lithium secondary battery. The physical properties are shown in Table 2.

Example 2

A copolymer was synthesized in the same manner as that of Example 1, and then, an aqueous binder solution was prepared in the same manner as that of Example 1, except that 11.2 g of sodium hydroxide was used in the saponification reaction. In this case, the composition ratio of vinyl acetate/vinyl alcohol/methyl acrylate/sodium acrylate in the synthesized copolymer was a molar ratio of 9/59/2/30. Thereafter, an anode for a secondary battery and a secondary battery were produced in the same manner as that of Example 1. The physical properties are shown in Tables 1 and 2.

Example 3

A copolymer was synthesized in the same manner as that of Example 1, and then, an aqueous binder solution was prepared in the same manner as that of Example 1, except that 8.4 g of sodium hydroxide was used in the saponification reaction. In this case, the composition ratio of vinyl acetate/vinyl alcohol/methyl acrylate/sodium acrylate in the synthesized copolymer was a molar ratio of 19/49/3/29. Thereafter, an anode for a secondary battery and a secondary battery were produced in the same manner as that of Example 1. The physical properties are shown in Tables 1 and 2.

Example 4

A copolymer was synthesized in the same manner as that of Example 1, and then, an aqueous binder solution was prepared in the same manner as that of Example 1, except that 3.7 g of sodium hydroxide was used in the saponification reaction. In this case, the composition ratio of vinyl acetate/vinyl alcohol/methyl acrylate/sodium acrylate in the synthesized copolymer was a molar ratio of 35/33/10/22. Thereafter, an anode for a secondary battery and a secondary battery were produced in the same manner as that of Example 1. The physical properties are shown in Tables 1 and 2.

Example 5

A copolymer was synthesized in the same manner as that of Example 1, except that the contents of the vinyl acetate and the methyl acrylate were changed to 30.0 g and 7.3 g, respectively. In this case, a weight average molecular weight of the synthesized vinyl acetate/methyl acrylate was 1,000 kDa. Thereafter, an aqueous binder solution was prepared in the same manner as that of Example 1, except that 8.4 g of sodium hydroxide was used in the saponification reaction. In this case, the composition ratio of vinyl acetate/vinyl alcohol/methyl acrylate/sodium acrylate in the synthesized copolymer was a molar ratio of 21/60/2/17. Thereafter, an anode for a secondary battery and a secondary battery were produced in the same manner as that of Example 1. The physical properties are shown in Tables 1 and 2.

Example 6

A copolymer was synthesized in the same manner as that of Example 1, except that the contents of the vinyl acetate and the methyl acrylate were changed to 20 g and 26 g, respectively. In this case, a weight average molecular weight of the synthesized vinyl acetate/methyl acrylate was 760 kDa. Thereafter, an aqueous binder solution was prepared in the same manner as that of Example 1, except that 8.4 g of sodium hydroxide was used in the saponification reaction. In this case, the composition ratio of vinyl acetate/vinyl alcohol/methyl acrylate/sodium acrylate in the synthesized copolymer was a molar ratio of 13/31/13/43. Thereafter, an anode for a secondary battery and a secondary battery were produced in the same manner as that of Example 1. The physical properties are shown in Tables 1 and 2.

Example 7

A copolymer was synthesized in the same manner as that of Example 1, except that the contents of the vinyl acetate and the methyl acrylate were changed to 15.0 g and 33.0 g, respectively. In this case, a weight average molecular weight of the synthesized vinyl acetate/methyl acrylate was 820 kDa. Thereafter, an aqueous binder solution was prepared in the same manner as that of Example 1, except that 8.4 g of sodium hydroxide was used in the saponification reaction. In this case, the composition ratio of vinyl acetate/vinyl alcohol/methyl acrylate/sodium acrylate in the synthesized copolymer was a molar ratio of 13/20/22/45. Thereafter, an anode for a secondary battery and a secondary battery were produced in the same manner as that of Example 1. The physical properties are shown in Tables 1 and 2.

Comparative Example 1

A copolymer was synthesized in the same manner as that of Example 1, and then, an aqueous binder solution was prepared in the same manner as that of Example 1, except that 13.9 g of sodium hydroxide was used in the saponification reaction. In this case, the composition ratio of vinyl acetate/vinyl alcohol/methyl acrylate/sodium acrylate in the synthesized copolymer was a molar ratio of 0/67/0/33. Thereafter, an anode for a secondary battery and a secondary battery were produced in the same manner as that of Example 1. The physical properties are shown in Tables 1 and 2.

Comparative Example 2

A copolymer was synthesized in the same manner as that of Example 1, and then, an aqueous binder solution was prepared in the same manner as that of Example 1, except that 2.1 g of sodium hydroxide was used in the saponification reaction. In this case, the composition ratio of vinyl acetate/vinyl alcohol/methyl acrylate/sodium acrylate in the synthesized copolymer was a molar ratio of 43/25/17/15. Thereafter, an anode for a secondary battery and a secondary battery were produced in the same manner as that of Example 1. The physical properties are shown in Tables 1 and 2.

Comparative Example 3

Styrene-butadiene rubber (SBR) and carboxymethyl cellulose sodium salt (CMC sodium salt) were purchased from Sigma-Aldrich, and an aqueous binder solution was prepared in the same manner as that of Example 1 using SBR and CMC at a mixing ratio of 1:1. Thereafter, an anode for a secondary battery and a secondary battery were produced in the same manner as that of Example 1. The physical properties are shown in Tables 1 and 2.

TABLE 1

| | Saponification ratio (b + d)/ (a + b + c + d) | Weight average molecular weight (Mw, kDa) | Tensile strength (kgf/cm²) | Strain at yield (%) | Adhesive force test (N/20 mm) | Coatability of composition for anode |
|---|---|---|---|---|---|---|
| Example 1 | 0.94 | 770 | 1,680 | 2.5 | 4.21 | ○ |
| Example 2 | 0.89 | 770 | 1,450 | 3.1 | 4.33 | ○ |
| Example 3 | 0.78 | 770 | 1,360 | 4.8 | 4.95 | ◎ |
| Example 4 | 0.55 | 770 | 1,282 | 5.4 | 4.1 | ○ |
| Example 5 | 0.77 | 1,000 | 1,077 | 4.7 | 5.9 | ○ |
| Example 6 | 0.74 | 760 | 1,005 | 4.6 | 3.5 | ○ |
| Example 7 | 0.65 | 820 | 1,325 | 3.3 | 3.8 | ○ |
| Comparative Example 1 | 1 | 770 | 1,100 | 1.3 | 2.1 | x |
| Comparative Example 2 | 0.40 | 770 | 1,201 | 5.7 | 1.9 | Δ |
| Comparative Example 3 | — | — | 134 | 200 | 2.5 | Δ |

It could be appreciated from Table 1 that the saponification ratio of each of Examples according to the present invention was 0.45 to less than 1, and when the saponification ratio of the binder for an anode was within the above range, the tensile strength and the adhesive force of the binder were excellent. When a composition for an anode is prepared using the binder, there is no aggregation and coatability is excellent, such that the adhesion properties of the binder for an anode may be improved, thereby suppressing peeling and deintercalation of the anode active material.

TABLE 2

| | One cycle charge capacity (mAh/g) | One cycle discharge capacity (mAh/g) | Initial efficiency (%) | Expansion rate (%) | Capacity retention rate (%) after 50 cycles of charging and discharging |
|---|---|---|---|---|---|
| Example 1 | 560 | 487 | 87.00 | 54 | 87 |
| Example 2 | 552 | 481 | 87.10 | 59 | 85 |
| Example 3 | 560 | 492 | 87.80 | 39 | 95 |
| Example 4 | 554 | 485 | 87.50 | 52 | 88 |
| Example 5 | 562 | 488 | 86.90 | 42 | 93 |
| Example 6 | 554 | 486 | 87.70 | 51 | 88 |
| Example 7 | 555 | 483 | 87.10 | 62 | 81 |
| Comparative Example 1 | 563 | 485 | 86.20 | 85 | 72 |
| Comparative Example 2 | 562 | 485 | 87.00 | 68 | 78 |
| Comparative Example 3 | 553 | 475 | 85.90 | 91 | 65 |

It was shown in Table 2 that in the binder for an anode according to the present invention, the binding force between the anode current collector and the anode active material was improved by the excellent coatability and adhesion properties, and the expansion rate was significantly low and the capacity retention rate after 50 cycles of charging and discharging was high compared to those in each of Comparative Examples. On the other hand, in Comparative Example 1 in which the saponification ratio was 1, Comparative Example 2 in which the saponification ratio was 0.4, and Comparative Example 3 in which the SBR/CMC mixed binder according to the related art was used, the expansion rate was significantly increased, and thus, the safety of the battery was significantly deteriorated and the charge and discharge life characteristics and the performance retention rate were also low.

As described above, the binder for an anode according to the present invention has an improved binding force between the anode current collector and the anode active material, such that peeling and deintercalation of the anode active material may be suppressed and the expansion and shrinkage of the anode may be efficiently suppressed, thereby improving the charge and discharge life characteristics and performance of the secondary battery.

As set forth above, the binder for an anode for a secondary battery that has the improved mechanical properties and adhesion properties, the anode including the binder, and the secondary battery including the anode may be provided.

The binder for an anode, the anode including the binder, and the secondary battery including the anode according to an exemplary embodiment of the present invention may prevent the expansion and shrinkage of the anode, such that the charge and discharge life characteristics and performance of the secondary battery may be improved.

The binder for an anode, the anode including the binder, and the secondary battery including the anode according to an exemplary embodiment of the present invention may have the excellent heat resistance and mechanical properties and the improved binding force.

The binder for an anode according to an exemplary embodiment of the present invention may have the improved coatability and adhesion properties, such that peeling and deintercalation of the anode active material may be suppressed, thereby improving the performance of the secondary battery.

Hereinabove, although the present invention has been described by specific matters and limited exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

What is claimed is:

1. A binder for an anode for a secondary battery, comprising: a copolymer having a main chain composed of a repeating unit (A) of the following Formula 1, a repeating unit (B) of the following Formula 2, a repeating unit (C) of the following Formula 3, and a repeating unit (D) of the following Formula 4,

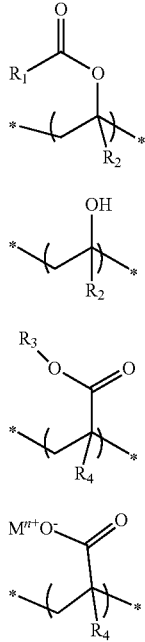

[Formula 1]

[Formula 2]

[Formula 3]

[Formula 4]

wherein
- $R_1$ and $R_3$ are each independently substituted or unsubstituted (C1-C10) hydrocarbyl,
- $R_2$ and $R_4$ are each independently hydrogen or substituted or unsubstituted (C1-C10) hydrocarbyl,
- $M^{n+}$ is a cation with an oxidation number of n excluding hydrogen ions, and
- n is an integer of 1 to 3, and wherein a saponification ratio of the copolymer satisfies Expression 1, $$0.55 \leq \text{saponification ratio} = (b+d)/(a+b+c+d) \leq 0.94 \quad \text{[Expression 1]}$$

wherein a is the number of moles of the repeating unit (A), b is the number of moles of the repeating unit (B), c is the number of moles of the repeating unit (C), and d is the number of moles of the repeating unit (D), wherein (a+b):(c+d) in the copolymer is 5:95 to 95:5, in which a is the number of moles of the repeating unit (A), b is the number of moles of the repeating unit (B), c is the number of moles of the repeating unit (C), and d is the number of moles of the repeating unit (D), wherein a:b in the copolymer is 5:95 to 60:40, in which a is the number of moles of the repeating unit (A) and b is the number of moles of the repeating unit (B), wherein c:d in the copolymer is 5:95 to 50:50, in which c is the number of moles of the repeating unit (C) and d is the number of moles of the repeating unit (D), and wherein a weight average molecular weight of the copolymer is 100,000 to 2,000,000 g/mol.

2. The binder of claim 1, wherein the copolymer is a random copolymer.

3. A composition for an anode for a secondary battery, comprising an anode active material and the binder for an anode for a secondary battery of claim 1.

4. The composition of claim 3, wherein the anode active material comprises a silicon-based active material.

5. The composition of claim 4, wherein the anode active material further comprises a graphite-based active material.

6. The composition of claim 5, wherein a mass ratio of the silicon-based active material to the graphite-based active material is 97:3 to 3:97.

7. The composition of claim 3, wherein a solid content of the composition is 45 wt % or more.

8. An anode for a secondary battery, comprising a current collector and an anode active material layer disposed on the current collector,
wherein the anode active material layer is formed of the composition for an anode for a secondary battery of claim 3.

9. The anode of claim 8, wherein a content of the binder in the anode active material layer is 0.5 to 30 wt %.

10. The anode of claim 8, wherein a thickness of the anode active material layer is 10 to 120 μm.

11. A secondary battery comprising:
the anode of claim 8;
a cathode;
a separator interposed between the anode and the cathode; and
an electrolyte.

12. The secondary battery of claim 11, wherein an expansion rate of the secondary battery is 65% or less.

13. The secondary battery of claim 11, wherein a capacity retention rate of the secondary battery after 50 cycles of charging and discharging is 80% or more.

* * * * *